Nov. 18, 1958 K. E. RHODES ET AL 2,860,758

RECORD POSITIONING DEVICE

Filed Dec. 31, 1956 9 Sheets-Sheet 1

INVENTORS.
KENNETH E. RHODES
WALTER W. WAGNER

BY

G. R. Gugger

AGENT

Nov. 18, 1958 K. E. RHODES ET AL 2,860,758

RECORD POSITIONING DEVICE

Filed Dec. 31, 1956 9 Sheets-Sheet 3

Nov. 18, 1958 K. E. RHODES ET AL 2,860,758

RECORD POSITIONING DEVICE

Filed Dec. 31, 1956 9 Sheets-Sheet 4

Nov. 18, 1958 K. E. RHODES ET AL 2,860,758

RECORD POSITIONING DEVICE

Filed Dec. 31, 1956 9 Sheets-Sheet 7

Nov. 18, 1958 K. E. RHODES ET AL 2,860,758

RECORD POSITIONING DEVICE

Filed Dec. 31, 1956 9 Sheets-Sheet 8

| DIGIT | CARD LINE SELECTION LS RELAYS ENERGIZED — FROM CARD — TENS | FROM CARD — UNITS | TRANSFER — TENS | TRANSFER — UNITS | TAPE CHANNELS PUNCHED IN CODE — TENS 8 | 9 | 10 | 11 | 12 | UNITS 3 | 4 | 5 | 6 | 7 |
|---|---|---|---|---|---|---|---|---|---|---|---|---|---|---|
| 0 | 5 6 | 10 11 | 24 26 | 32 33 | 8 | 9 | | | | 3 | 4 | | | |
| 1 | 7 8 | 12 13 | 27 29 | 35 36 | | | 10 | 11 | | | | 5 | 6 | |
| 2 | 5 9 | 10 14 | 24 30 | 32 38 | 8 | | | | 12 | 3 | | | | 7 |
| 3 | 6 7 | 11 12 | 26 27 | 33 35 | | 9 | 10 | | | | 4 | 5 | | |
| 4 | 8 9 | 13 14 | 29 30 | 36 38 | | | | 11 | 12 | | | | 6 | 7 |
| 5 | 5 7 | 10 12 | 24 27 | 32 35 | 8 | | 10 | | | 3 | | 5 | | |
| 6 | 6 8 | 11 13 | 26 29 | 33 36 | | 9 | | 11 | | | 4 | | 6 | |
| 7 | 7 9 | 12 14 | 27 30 | 35 38 | | | 10 | | 12 | | | 5 | | 7 |
| 8 | 5 8 | 10 13 | 24 29 | 32 36 | 8 | | | 11 | | 3 | | | 6 | |
| 9 | 6 9 | 11 14 | 26 30 | 33 38 | | 9 | | | 12 | | 4 | | | 7 |

FIG_5

United States Patent Office 2,860,758

Patented Nov. 18, 1958

2,860,758

RECORD POSITIONING DEVICE

Kenneth E. Rhodes and Walter W. Wagner, Endicott, N. Y., assignors to International Business Machines Corporation, New York, N. Y., a corporation of New York Application December 31, 1956, Serial No. 631,676

15 Claims. (Cl. 197—133)

This invention is concerned with record spacing devices and more particularly with the selection of print receiving lines on individual record sheets according to a comparison of line selection indicia on record cards with corresponding coded line selection indicia on feed control tapes which are synchronized in movement with the record sheets.

The invention is illustrated as an improvement on the tape controlled record feeding devices of the kind disclosed in Patent No. 2,531,885, to A. W. Mills et al., filed August 9, 1945, and issued on November 28, 1950; Patent No. 2,569,829, to E. J. Rabenda, filed May 3, 1949, and issued October 2, 1951; and Patent No. 2,672,287, to H. A. Reitfort, filed April 11, 1951, and issued on March 16, 1954. The invention is also illustrated as an improvement on a bill printing device of the kind disclosed in Patent No. 2,573,313, to J. E. Dayger et al., filed April 7, 1950, and issued on October 30, 1951.

An object of the present invention is to provide a combination tape controlled carriage and bill feed device having greater flexibility of operation particularly with respect to the feeding of individual record sheets and the selection of the print receiving lines thereon.

As is known in the art, tape controlled carriages are used for selective feeding and printing of continuous record strips and since the record strip and control tape are synchronized in movement the location of the first print receiving line may be varied for each form on the continuous strip and still be automatically controlled by the tape. Tape controlled bill feeds have also been used, in some instances, for feeding individual sheets, the movement of the control tape being synchronized with each sheet as the sheet moves from an aligner station through the printing station. However, in this case since each sheet always stops at the aligner station the first print receiving line on each sheet must be the same or else the control tape and sheets get out of step and line selection cannot be controlled. In the case of non-tape controlled bill feed devices, the first printing line adjustment is a mechanical one and once the first printing line adjustment is made for the first sheet, all succeeding sheets will have the first line of printing in the same place.

Accordingly, it is an object of the present invention to provide a tape controlled bill feed for automatically processing individual sheets having varying first line printing locations thereon.

A further object of the present invention is to provide a bill feed device as in the preceding object and having two carriage control tapes such that as one tape controls the stop position of a sheet at the printing platen the other tape would be indexed with the sheet at the aligner station.

A further object of the present invention is to provide a bill feed device as in the preceding object wherein means are provided for switching between the two carriage control tapes to enable them to alternate in function.

A still further object of the present invention is to provide a tape controlled bill feed device having improved circuit means for selecting the location of a print receiving line in any one of 100 possible positions.

Other objects of the invention will be pointed out in the following description and claims and illustrated in the accompanying drawings, which disclose, by way of examples, the principle of the invention and the best mode, which has been contemplated, of applying that principle.

Figs. 3*a*–3*d* comprise a wiring diagram showing the electrical controls of the line selecting devices as associated with the related tabular and tape carriage controls of Patent 2,569,829.

Figure 4A:
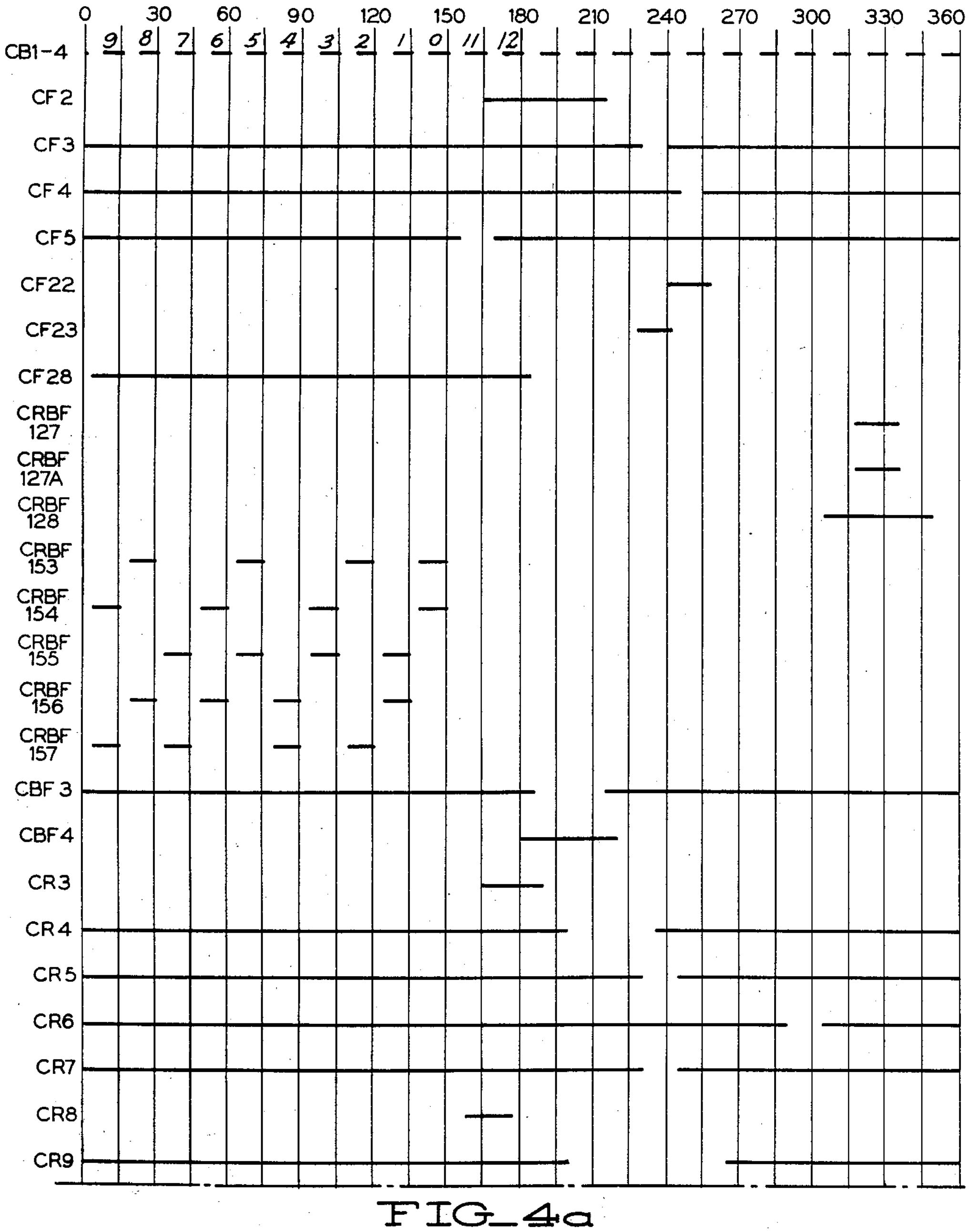
Figure 4B:
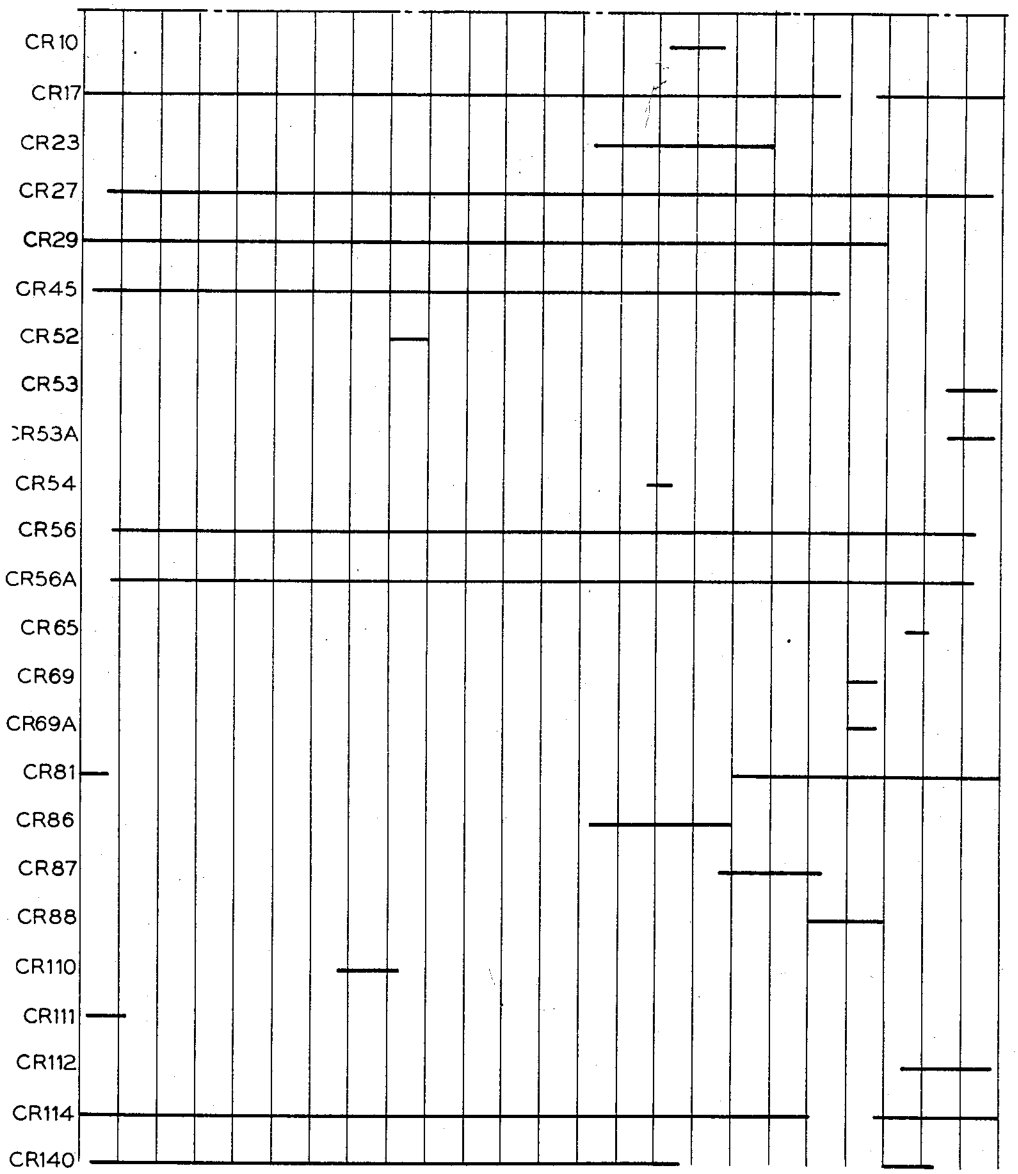

Figs. 4*a*–4*b* comprise a timing chart showing the effective times of the various cam contacts.

Fig. 5 is a chart showing the relationship between the various digits and code perforations of such digits in the cards and tape to pick up related line selection relays.

Figure 1:
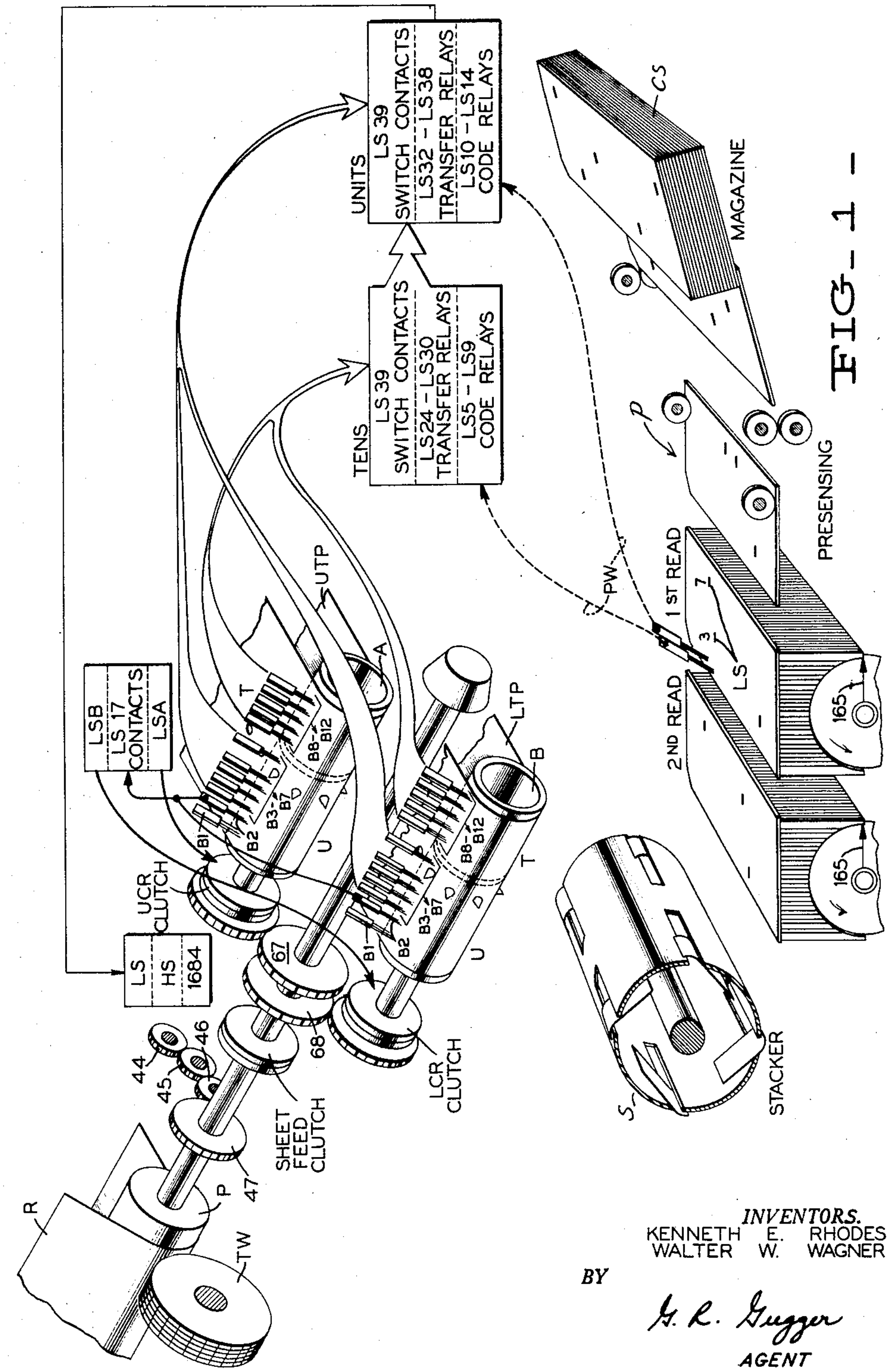
Fig. 1 is a diagrammatic perspective view showing the main components of the line selecting devices.

The operation of the line selection devices may be summarized with reference to the diagrammatic showing in Fig. 1. There it is noted that a record sheet R is wrapped around a platen P which is connected through a clutch CL to a suitable drive input. The platen is also connected through clutches UCR and LCR to an upper control tape UTP and a lower control tape LTP, which tapes are alternately advanced in synchronism with the rotation of the platen and the advance of the record sheet. Control records or cards CS are advanced in succession from a magazine M past a presensing station P, a first read station, a second read station, and on to a stacker S. A plurality of record columns are set aside for line selection perforations LS for designating or representing the line of the record sheet upon which it is desired to record the data sensed on the related card.

From the line selecting brushes at the first read station a pair of sets of plug wires PW are connected to tens and units code relays LS5–9 and LS10–14. The energized condition of these primary code relays is transferred to sets of secondary or transfer relays LS24–30 and LS32–38. The transfer relays have control contacts arranged in labyrinth circuits connected as part of comparing circuits involving the tape sensing brushes B3–7 and B8–12 of both the upper and lower contact rolls relating to the units and tens tape sensing devices respectively.

In the past there has been only one control tape, sensing roller and tape sensing brushes related thereto to detect tape perforations corresponding to and aligned with various parts of the record sheet form. However, in the present case the novel devices comprise two control tapes each having a related sensing roller and set of tape sensing brushes and accordingly there is provided in the labyrinth circuits contacts of a switching relay LS39 to insure that the line selection comparison is made between the card and a selected one of the control tapes.

Another change is that involving the tape sensing brushes and the various channels on the tape ordinarily associated with the regular stopping positions. Now, in the novel devices, each tape is punched in a coded arrangement so that the simultaneous coincidence of holes in more than one channel is required for location of a selected print line. A two of five code is utilized to make ten selections available from five channels and since the tape contact rolls are each electrically separated in the center so that the two of five code may be independently applied to each side of the separator, ten times ten or one hundred selections are possible on each tape representative of any one of one hundred lines on the record sheet R.

The clutches UCR and LCR for the two contact rolls are continuously engaged by means of circuits controlled by relays LSA, LSB and eject relay LS17. During each eject cycle, relays LSA and LSB are operated from a perforation in channel two of the control tape selected by contacts of the eject relay LS17. Contacts of LS17 permit the selected control tape contact roll clutch to disengage and latch its contact roll in the index or home position. The other control tape and contact roll meanwhile move in synchronism with the record sheet R in the bill feed as it moves from the aligner station to the printing platen. The machine is designed so that the tape being indexed will reach its home position before the other tape reaches print position. At the same time, the following record sheet R moves from the bill feed hopper to the aligner station and it will be stopped at the aligner and will be in correct alignment with the control tape that is latched in its home position. As the record sheet moving to the platen is stopped for the first line of print operation, relays LSA and LSB are released thereby causing both control tape contact rolls to be operated. Thereafter the record sheets and control tapes move in unison until the next eject cycle is signalled and a control tape contact roll is stopped in its indexed position with the aligner station.

The eject relays LS17 and LS39 function to switch controls between tape contact rolls and when these relays are not operated, the stop positions of the sheet in printing position are controlled by the upper control tape contact roll. When an eject cycle is signalled relays LS17 and LS39 are operated and as long as they are operated, the stop positions of the sheet in printing position are controlled by the lower control tape contact roll. The following eject cycle will release relays LS17 and LS39 to which control of the record sheet back to the upper control tape and roll.

As shown in the wiring diagram (Figs. 3*a*–3*d*) the controls of the line selection devices are coordinated with the controls of an alphabet printing tabulator provided with a tape control bill feed. The tabulator is of the type described in U. S. Patent 2,569,829, to which reference may be made for details of construction.

Before describing the manner in which the line selection controls are influenced by the ordinary tabulator and tape feed controls and operations, it is believed well to outline the essential tabulator devices.

As will be referred to in the description of the electrical circuits, the machine is provided with a series of cam contacts which are well known in construction and operation and are designated as CR and CRBF cam contacts which are continually opening and closing during each cycle of operation of the machine and CF cam contacts which open and close during card reading operations of the machine, accompanied or not by a card feed operation. The cams which operate the CR and CRBF contacts are driven by the main drive shaft of the machine which is rotated one revolution for each operation of the machine.

The CF cam contacts are operated during each card reading operation of the machine through a one-revolution clutch and for each card feed cycle the energization of a CF cam clutch magnet 280 causes one revolution of the drive shaft carrying the CF cams.

Other CB or circuit breaker cam contacts are operated by connections to the main drive shaft.

The initiation of card feed and sequential card feeding operations will, it is believed, be best understood by describing the operation of the machine in connection with the circuit diagram.

A prerequisite to initiation of card feed is that hopper contacts 270 (Fig. 3*a*) are closed and this is effected by placing cards in the supply magazine of the machine. When all the cards have been fed out of the magazine the contacts will open and the machine will automatically stop.

Closure of the main switch causes current to be supplied from the power supply PS and lines 920 and 921. With hopper contacts 270 closed, an obvious circuit to energize R1625 relay is closed and a hold circuit for said relay is provided by R1625*c* relay contacts and cam contacts CR9.

Initiation of card feed is effected by depression of the stare key which closes contacts 274 to close a circuit from the line 920, wire 272, start key contacts 274, the normally closed side of bill feed switch contacts RBF1*j*, the pickup coil of the start relay R1636, to line 921. R1636 relay closes its contacts R1636*b* and a hold circuit is provided back to line 920 through cam contacts CR6 to hold R1636 relay energized over and through part of the second machine cycle. When CR6 contacts open during the second machine cycle, if the start key is not retained depressed, R1636 relay will de-energize and for this reason the start key is maintained depressed or re-depressed until a card issues from the magazine.

At 200 degrees of a cycle, while R1636 relay coil is energized, cam contacts CR86 close to complete a circuit from line 920, stop key contacts 277, closed carriage stop contacts R1471*a*, CR86 cam contacts, start key R1636*a* relay contacts, R1638 relay coil and wire 918 to line 921. The hold circuit for relay R1638 is through the R1638*b* relay contacts and cam contacts CR7 which holds it energized until 230 degrees of the next cycle.

R1638 relay closes R1638*c* relay contacts, completing a circuit at 245 degrees from line side 920, cam contacts CR5, contacts R1638*c*, R1639 pick relay coil, and line 921. A hold circuit is maintained by cam contacts CR4, through R1639*a* relay contacts until 200 degrees of the following cycle. When R1639*b* contacts are closed, they complete a circuit from line 920, R1639*b* relay contacts now closed, wire 989, CR87 cam contacts, picker clutch magnet 64, and wire 918 to line 921.

Energization of picker clutch magnet 64 at 250 degrees when CR87 closes, causes the engagement of the picker clutch at about 285 degrees of the first machine cycle, and the lowermost card is then advanced from the supply magazine M to constantly rotating feed rolls which feed the card to the presensing station P; and when this condition is obtained, a card lever is rocked to close the presensing station card lever contacts 276 at 144 degrees of the second machine cycle, or the first card feed cycle, but are kept closed due to the combined presence of a card in the P station.

At 285 degrees of the first machine cycle, cam contacts CR88 close, completing a circuit from line 920, R1639*b* relay contacts, wire 989, R1630*c* relay contacts, CR88 cam contacts, clutch magnet 280, wire 918 and line 921. Energization of this magnet will cause the engagement of the conventional one-revolution clutch to initiate rotation of the shaft which operates the CF contacts. The aforementioned energizing circuit for the clutch magnet 280 is for the first machine cycle. In subsequent card feed cycles, as will be explained, and upon the presence of cards at station P, the R1628 relay will be energized to close the R1628*c* relay contacts to impulse the clutch magnet 280.

After pre-test contacts 276 are closed at 144 degrees of the second machine cycle, CR8 cam contacts close to complete an obvious circuit to the R1628 pick relay coil. R1628*a* relay contacts then close to complete a holding circuit back to line 920 through the CF5 cam contacts. CF5 cam contacts extend the energization of the relay over and through the next or second card feed cycle. When R1628*c* relay contacts close during this second machine cycle and cam contacts CF2 close during this and succeeding machine cycles, a circuit is completed to energize clutch magnet 280.

The start key will be held down or depressed the second time to re-energize R1636 relay and the operation will be repeated to advance the card from the first read station and to feed the second or following card from the supply magazine to the first read station.

Energization of the R1628 relay closes R1628*d* contacts which it will be recalled, are closed only when a card is at the presensing station so as to complete at 165 degrees a circuit during the second machine cycle or first card feed cycle from the line 920 through CR3 cam contacts, wire 988, R1628*d* relay contacts, R1639*c* relay contacts now closed, to the gripper clutch magnet 153 and line 921. This clutch magnet causes the operation of mechanism which closes gripping devices to feed the first card from the presensing station to the read station, and other cards from station to station in a manner described in the afore-mentioned Patent 2,569,829. It also controls card stops which are lowered to allow a card to advance, and raised to stop the card at the next station.

Closure of cam contacts CF22 at 240 degrees of the second machine cycle or first card feed cycle causes completion of a circuit from line 920 through cam contacts CF5 now closed, R1628*a* pre-test relay contacts now closed, CF22 cam contacts to the pickup winding of the R1630 relay. The latter will close the R1630*a* relay contacts to complete a hold circuit for the holding winding of the R1630 relay extending back through the R1630*a* relay contacts, R1625*b* hopper relay contacts, or CF4 cam contacts during the cycle in which the last card run out passes the read station. R1630 relay will thereupon open the R1630*c* relay contacts so that the impulse emitted by CR88 cam contacts to the CF cam clutch magnet 280 will be subsequently directed through the R1628*c* relay contacts for card feed cycles after the first. During the third machine cycle, or the second card feed cycle, cam contacts CF23, which are timed to close slightly earlier than CF22, will close and complete a circuit from the line 920 through CF4 cam contacts, R1630*a* relay contacts now closed, CF23 cam contacts to the pickup winding of the R1632 relay. The latter closes the R1632*a* hold contacts providing a hold circuit for the holding winding of the R1632 relay and the pick coil of relay R1634 extending back through CF3 cam contacts, or the R1625*a* hopper relay contacts back to line 920. R1632 relay closes R1632*d* contacts which in conjunction with R1628*b* relay contacts and R1625*d* relay contacts now closed provide an alternate holding circuit for the R1638 relay to keep R1638 energized when hold cam contacts CR7 for the R1638 relay open. This alternative circuit keeps the machine running until the hopper is empty, the stop key is depressed, or a card fails to feed to the presensing station.

Under normal card feed conditions and so long as cards continue to feed through the presensing station, the card picker control clutch magnet 64, CF cam control clutch magnet 280 and gripper control clutch magnet 153 will also be re-energized each cycle under normal conditions so long as cards continue to feed through the machine.

Summarizing, during each cycle of operation, test circuits function to determine whether a card has been properly fed by the picker blade and the feed rolls to the intermediate presensing station P. The gripper clutch magnet 153 controls movement of the first card from the first reading position to the second reading position at the same time that the following card is moved from the presensing station to first reading station. During the following cycle, the first card is moved by the gripper clutch control from the second reading into the stacker, the second card from the first reading station to the second reading station, and the third card from the presensing station to the first reading station.

Figure 3A:
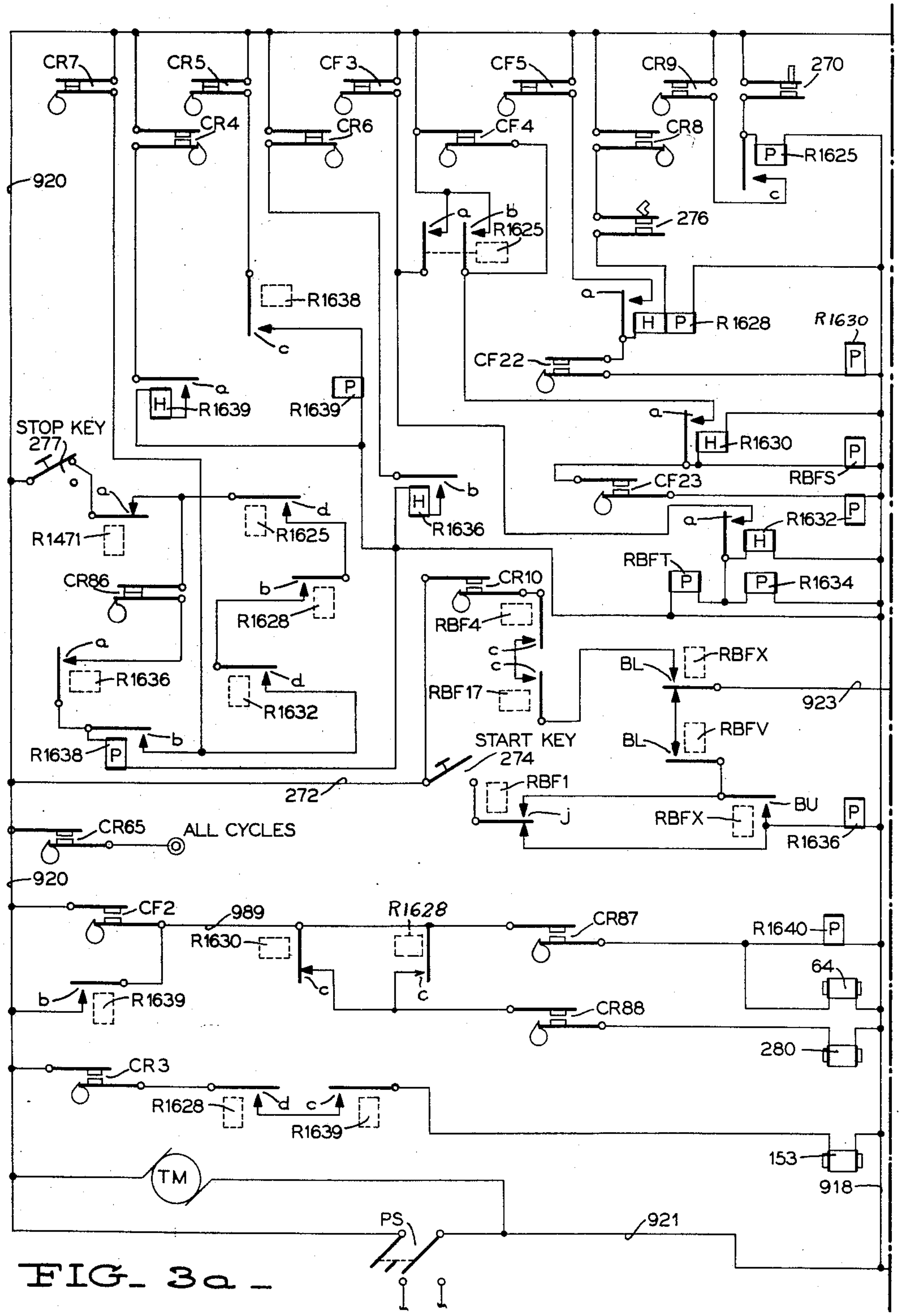
Figure 3B:
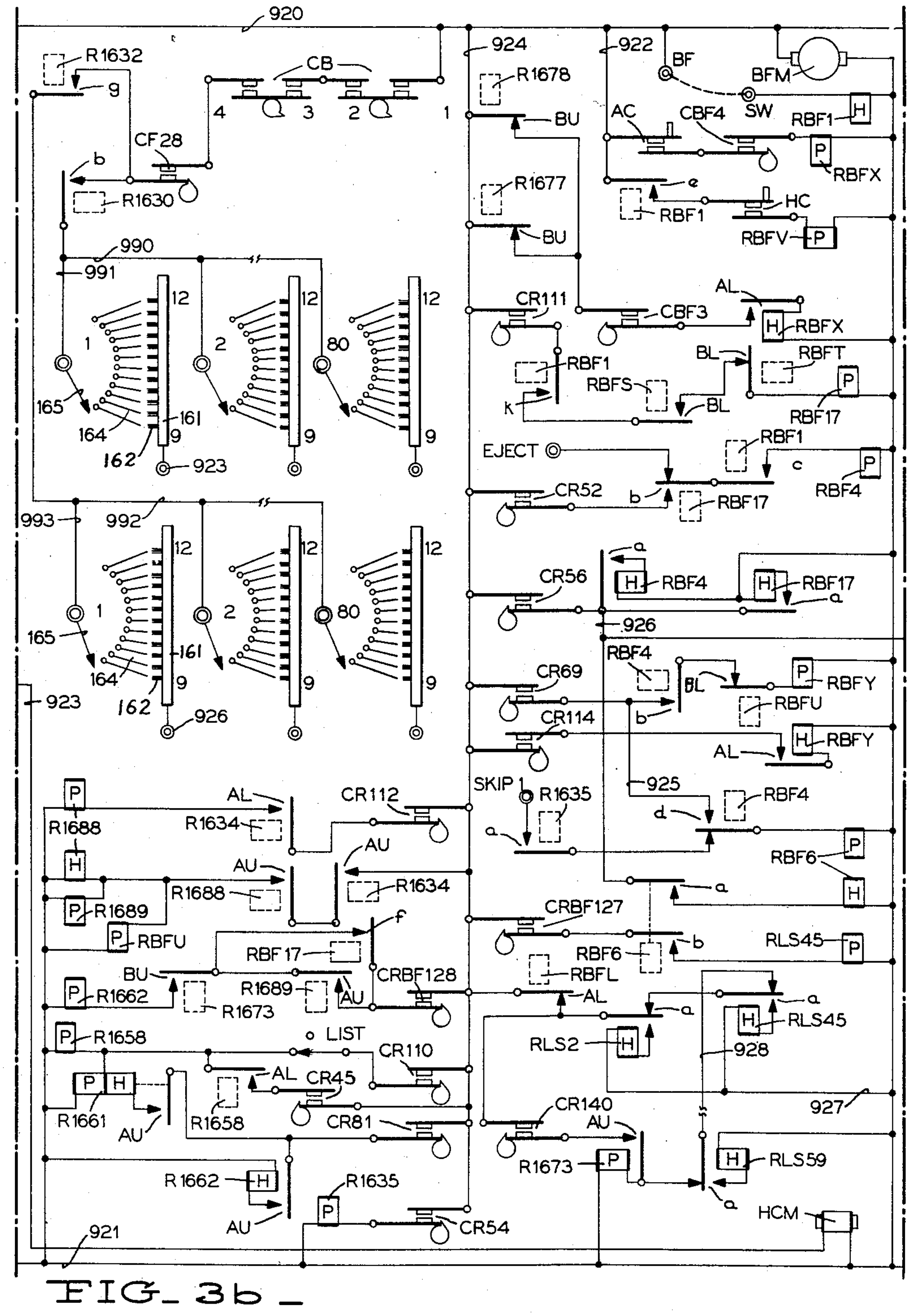

The circuits whereby the perforated cards may be analyzed at the first reading station and the second reading station are shown in Fig. 3*b* wherein it will be seen that for column 1 the arrangement of the sensing commutator is shown diagrammatically. Of course, this arrangement is duplicated for the 80 columns in each of the reading stations. The sensing circuit for the first reading station is from the line side 920, circuit breaker contacts CB1–4, CF28 cam contacts, first reading relay R1630*b* contacts which are closed during the analyzing time, thence to a wire 990. The wire 990 has a respective wire connection 991 to the brush 165 of the first column commutator. The brush readout 165 makes successive contact with the contact points 164 and the circuit will be closed through the particular brush 162 which passes through the card perforation. Each plate 161 which carries the series of analyzing brushes 162 has a wire connection to a respective plug socket such as socket 923 in the first column. For the first reading station there is a series of eighty plug sockets from which plug connections are made for control purposes.

The sensing circuit for the second reading station extends from the CF28 cam contacts, thence through the second reading R1632*g* relay contacts to a wire 992 which has one first wire 993 of multiple wire connections to the brush readout 165 representative of a series of sensing commutators for the second reading station. There is, likewise, a series of eighty plug sockets such as socket 926 for the second reading station from which plug connections are made to the desired controls or printing orders to operate type wheels TW for printing of information corresponding to the perforated data.

The foregoing sections of the description dealing with the wiring and electrical controls are concerned, in the main, with devices usually found in tabulating machines. The following portions of the specification are devoted to the features of the tape control of record feed and the novel line selection controls. Before discussing the circuit controls for record sheet feeding and line selection; however, a discussion of the mechanical features of the bill feed for transporting the individual record sheets is in order.

Figure 2:
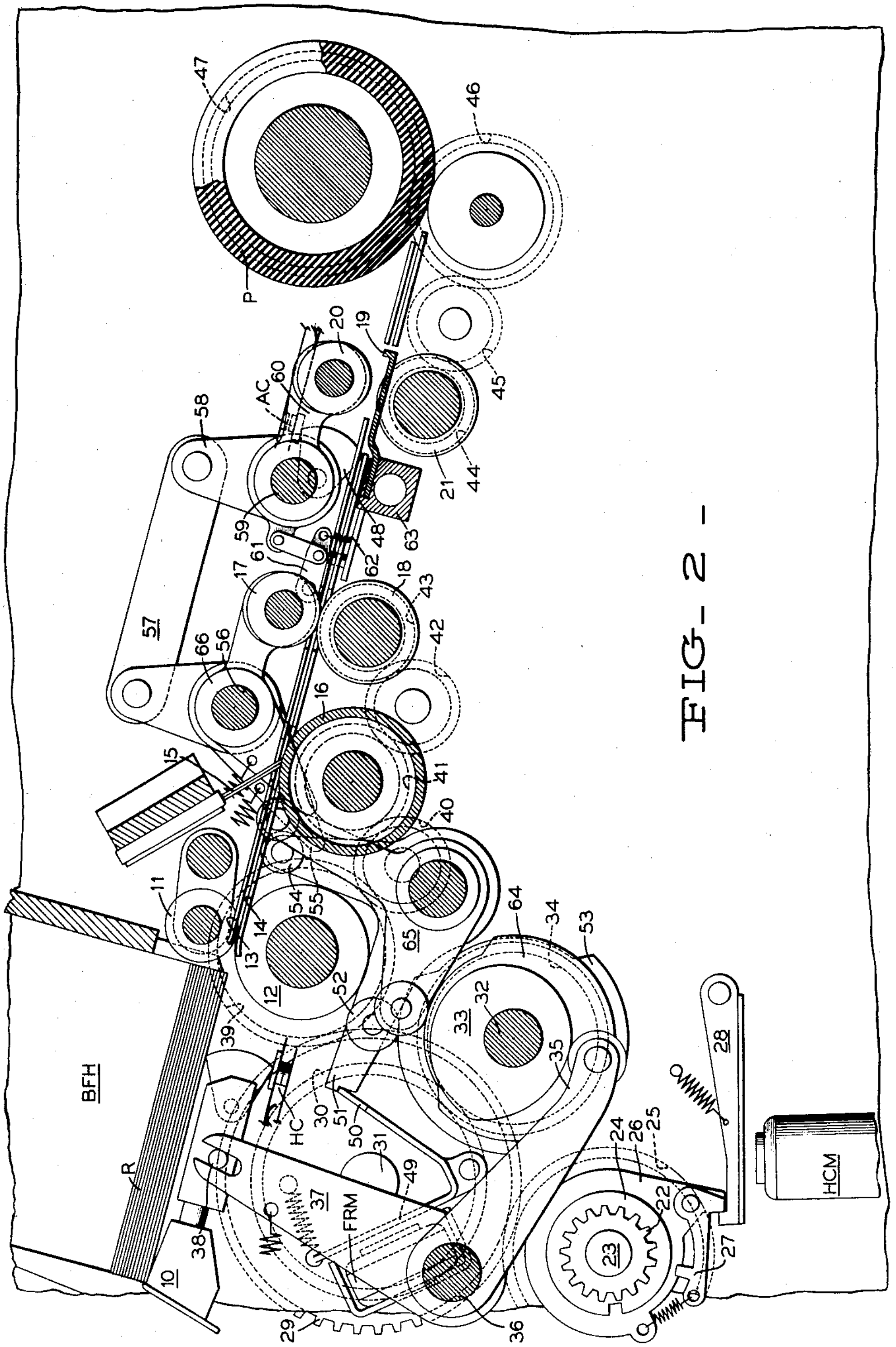
Fig. 2 is a vertical section taken through the center of the bill feeding mechanism.

Referring to Fig. 2, the record sheets R are placed in the bill feed hopper BFH from which they are fed out in succession by means of the usual picker knife arrangement. Energization of a hopper clutch magnet HCM serves to effect an operation of the picker knives 10 to feed a sheet out of the hopper into a pair of feed rolls 11, 12, which are also called into operation by the hopper clutch magnet. The feed rolls 11, 12 feed the sheet in between suitable sheet guides 13, 14, on past a row of bill feed sensing brushes 15 and associated contact roll 16 and into a second set of feed rolls 17, 18 which are also under control of the hopper clutch. From the feed rolls 17, 18, the sheet is fed to the aligner station which comprises the sheet aligner 19 and the third set of feed rolls 20, 21. The third feed rolls are under control of the platen drive and during an eject cycle they serve to feed the sheet from the aligner station to the platen in step with the control tape which was indexed to its home position.

Power for the bill feed unit is taken from a clutch drive gear 22 fast on a shaft 23 which is suitably driven from the bill feed motor for continuous operation as long as power is supplied to the motor. Fixed to the gear 22 is a clutch disk 24 in axial alignment with a normally idle clutch gear 25. Attached to the driven gear 25 is a bell crank 26 which carries a clutch pawl 27. Pawl 27 is spring urged towards engagement with the notch in moving disk 24 but is held out of engagement by the hooked end of armature 28 which only releases the pawl when the bill feed hopper clutch magnet HCM is energized.

When the magnet HCM is energized, the gear 25 is driven and this gear drives a pair of gears 29 and 30 loose on a short shaft 31. The smaller gear 30 drives a cam shaft 32 and picker knife cam 33 through a gear 34. The cam 33 operates a cam follower arm 35 fast on a pivot shaft 36 and, through the spring biased picker knife arm 37 fastened on the pivot shaft and stud connection 38, causes oscillation of the picker knives 10 to feed a sheet out of the hopper.

The larger gear 29 serves to drive the lower first and second feed rolls 12 and 18 as well as the contact roll 16 through a gear train involving the gears 39, 40, 41, 42 and 43. The lower third feed roll is driven directly from the platen P through the feed roll gear 44, idler gears 45, 46 and platen gear 47.

The sheet feeds out of the hopper on past the sensing brushes 15 and through the second feed rolls striking a pivoted card lever 48 positioned in advance of the aligner station to close a pair of aligner contacts AC for purposes to be described. As the sheet enters the third feed rolls, the upper rolls 20 are in a raised position and the sheet will not be effected by the third feed roll set since the lower rolls 21 are driven by the platen which may be idle at this time. The sheet, however, continues to move under control of the second feed rolls 17, 18, until it comes to rest against the aligner stop 19 which is pivoted into the path of the sheet concurrently with the lifting of the third upper rolls 20.

The mechanism for operating the third rolls and the aligner stop is under control of a feed roll magnet FRM having a pivotally mounted armature 49 and latch arm 50. When the magnet is de-energized the arm 50 serves to latch a pivoted bell crank 51 and roller follower 52 clear of a cam 53 fast on the cam shaft 32. The bell crank has attached thereto a second roller 54 which coacts with a spring biased plate 55 free on a shaft 56 suitably journaled in the frame of the machine. The plate 55 is connected by a link 57 to an arm 58 fixed on a shaft 59 also suitably journaled in the frame of the machine. Also fixed on the shaft 59 is an arm 60 which carries the third upper feed roll 20. It can be understood that energization of magnet FRM during an eject cycle will free the bell crank 51 for counterclockwise rotation upon encountering the low portion of the cam 53 and accordingly, through the linkage described, the shaft 59 and arm 60 will be rotated clockwise dropping the feed roll 20 on the sheet to feed the sheet from the aligner station to the platen.

A rearwardly extending portion of the arm 58 is fastened to a pivoted lever 61 which overlies and is connected by spring 62 to a pivoted support member 63 for the aligner stop 19. By means of the lever 61 and spring 62, the aligner stop is concurrently pivoted down out of the path of the sheet when roll 20 is dropped and is raised into the feed path of the sheet when the roll 20 is lifted. The raising of the feed roll and aligner stop occurs when the high portion of cam 53 rotates the bell crank 51 clockwise and they will be latched in the raised position until magnet FRM receives another impulse.

Shortly after the sheet is stopped by the aligner 19 the second upper feed rolls 17 are raised from the sheet by means of a cam 64 fast on the cam shaft 32 and a pivoted bell crank follower 65. The bell crank 65 coacts with a spring biased support member 66 pinned on the shaft 56 to raise and lower the feed roll 17 which is supported on the member 66.

As will be understood, at the end of a skipping operation, the FRM magnet will be impulsed and the third feed roll is dropped down and the aligner lowered out of the way. The sheet at the aligner station will now move whenever the platen turns. After the sheet at the print station has its last line of information printed on it, the hopper clutch will be engaged to start feeding another record sheet from the hopper to the aligner, and the line space clutch will be impulsed to move the printed sheet to suitable continuously running rolls (not shown) for conveyance to a stacker, and the sheet at the aligner station into the print station where it will be stopped by the present novel line selection controls. The sheet stacker, which is not shown, may take the form of a conventional drum type stacker having gripper jaws for receiving the ejected sheets. A stacker of this type is shown and described in the afore-mentioned Patent 2,573,313.

Turning now to the wiring diagram and in particular to Fig. 3*b*, it may be seen that with the main switch closed and power on the lines 920, 921 the bill feed motor BFM is in continuous operation. Associated with the motor are two feed clutches, the one being controlled by the low speed magnet LS, which is energized alone for spacing and skipping, and the other clutch is called in by magnet LS and the high speed interposer magnet HS which is energized to clutch other gearing to carry out long feeding or high speed ejection. Reference may be had to the afore-mentioned Patent 2,569,-829, for the structural details of these two clutches. Most of the wiring is concerned with the operation of one or both of these two clutch control magnets, and the stopping of the platen and tape drums.

Operation of the bill feed is initiated by placing record sheets in the bill feed hopper and wiring the bill feed switch on. With the bill feed switch on an obvious circuit is completed to maintain relay RBF1 energized and a circuit will be completed from line 920, wire 922, contacts RBF1*e* now closed, hopper contacts HC, closed with sheets in the bill feed hopper, the pick coil of hopper relay RBFV and line 921. The hopper relay will remain energized as long as sheets remain in the bill feed hopper. Now the start key is depressed to complete a circuit from line 920 (Fig. 3*a*), wire 272, start key 274, contacts RBF1*j*, now transferred, the closed contacts RBFV—BL, normally closed side of contacts RBFX—BL, wire 923, the hopper clutch magnet coil HCM (Fig. 3*b*) and line 921. This causes the first sheet to feed out of the hopper to the aligner station. On this cycle the platen shaft does not operate.

The aligner contacts are closed at about 170 degrees by thet sheet feeding into the aligner station and from 180 to 220 degrees a circuit can be completed from line 920 (Fig. 3*b*), wire 922, aligner contacts AC, cam contacts CBF4, the pick coil of relay RBFX and line 921. Relay RBFX will hold until 185 degrees of the next bill feed cycle by a circuit extending from line 920, wire 924, the normally closed contacts R1678BU and R1677BU in parallel, cam contacts CBF3, contacts RBFX—AL, now closed, the hold coil of relay RBFX and line 921. The bill feed will latch at 240 degrees on the bill feed index; however, the relay RBFX remains energized while the bill feed is stopped.

The next depression of the start key will complete a circuit from line 920 (Fig. 3*a*), wire 272, start key 274, the transferred contacts RBF1*j*, contacts RBFX—BU, now closed, the pick coil of tabulator start relay R1636 and line 921. Upon energization of the start relay R1636 the tabulator will be called into operation by the circuits previously described. It will be remembered that when the first card feeds in the tabulator, relay R1628 (Fig. 3*a*) will be energized at 157 degrees after the pre-test contacts 276 close and relay R1630 will pick at 243 degrees of the same cycle. When the hold circuit for relay R1630 through contacts R1625*b* is available by the closing of the R1630*a* contacts, a relay RBFS is energized.

At the beginning of the cycle in which the first card is read at the first reading station in the tabulator, a circuit is completed from line 920 (Fig. 3*b*), wire 924, cam contacts CR111, contacts RBF1*k*, now closed, closed contacts RBFS—BL, normally closed contacts RBFT—BL, the pick coil of first sheet eject relay RBF17 and line 921. Relay RBF17 will hold until 348 degrees of the next tabulator cycle by a circuit which extends from line 920, wire 924, cam contacts CR56, closed contacts RBF17*a*, the hold coil of relay RBF17 and line 921. At this time the purpose of RBF17 is to provide the proper run-in condition in the bill feed. As the card in the tabulator moves to the second read station, the sheet in the bill feed must move into print position and the new sheet fed out of the hopper to the aligner. The RBF17 relay will be energized for one cycle only and will effect the completion of a circuit at 120 degrees which extends from line 920, wire 924, cam contacts CR52, the transferred contacts RBF17_b_, closed contacts RBF1_c_, the pick coil of eject relay RBF4 and line 921. Relay RBF4 will hold until 348 degrees by a circuit which extends from line 920, wire 924, cam contacts CR56, closed contacts RBF4_a_, the hold coil of relay RBF4 and line 921. At 300 degrees a control relay RBFY is picked by a circuit extending from line 920, wire 924, cam contacts CR69, closed contacts RBF4_b_, normally closed contacts RBFU—BL, the pick coil of relay RBFY and line 921. Relay RBFY holds until 280 degrees by a circuit which extends from line 920, wire 924, cam contacts CR114, closed contacts RBFY—AL, the hold coil of RBFY and line 921.

With relay RBF4 energized, a circuit was completed at 230 degrees which extends from line 920 (Fig. 3_a_), wire 272, cam contacts CR10, closed contacts RBF4_c_, closed contacts RBF17_c_, transferred contacts RBFX—BL, wire 923, the hopper clutch magnet HCM (Fig. 3_b_), and line 921. The hopper clutch engaged at 240 degrees to feed a second sheet.

At 300 degrees a tape control relay RBF6 is energized by a circuit from line 920 (Fig. 3_b_), wire 924, cam contacts CR69, wire 925, transferred contacts RBF4_d_, the pick coil of relay RBF6 and line 921. Relay RBF6 is held until 348 degrees by a circuit from line 920, wire 924, cam contacts CR56, wire 926, closed contacts RBF6_a_, the hold coil of relay RBF6 and line 921. Energization of RBF6 will complete a circuit from line 920, wire 924, cam contacts CRBF127, closed contacts RBF6_b_, the pick coil of a line selection skip relay RLS45 and line 921. The line selection relay will remain energized until a stop hole is read in one of the control tapes by a circuit extending from line 920, wire 924, normally closed contacts RBFL—AL, normally closed side of contacts RLS2_a_, transferred contacts RLS45_a_, the hold coil of relay RLS45, wire 927 and line 921. The energization of relay RLS45 at 317 degrees places the hold circuit for an interlock relay R1673 under control of cam contacts CR140. This relay is normally energized but is de-energized during all skipping operations. When normally energized, RLS45 will bring about stoppage of the sheet under control of a perforation in channel 1 of the tape unless line selection operation is called in. The relay is normally energized by a circuit extending from line 920 (Fig. 3_b_), wire 924, normally closed contacts RBFL—AL, normally closed contacts RLS2_a_, normally closed side of contacts RLS45_a_, wire 928, the normally closed side of similar "_a_" contacts (not shown) of other line selection skip relays similarly connected in series between wire 928 and line 921, normally closed side of contacts RLS59_a_, the pick coil of interlock relay R1673 and line 921. Transfer of the RLS45_a_ contacts, as well as any of the "_a_" contacts for the skip relays will place the R1673 hold circuit under control of cam contacts CR140 through contacts R1673AU and contacts RBFL—AL.

At 100 degrees of every list cycle of the tabulator a skip control relay R1661 and a print control relay R1658 are energized in parallel by a circuit extending from line 920 (Fig. 3_b_), wire 924, cam contacts CR110, list switch on, the pick coils of relays R1658 and R1661 and line 921. Relay R1661 holds until 295 degrees of the cycle through the closed contacts R1658AL and cam contacts CR45 and then is further held until 10 degrees of the next cycle through the closed contacts R1661AU and cam contacts CR81.

At 322 degrees in the run-in cycle a circuit is completed from line 920, wire 924, cam contacts CRBF128, closed contacts RBF17_f_, closed contacts R1673BU, the pick coil of skip control relay R1662 and line 921. The relay R1662 is held by the cam contacts CR81 through the closed contacts R1662AU.

After the first run-in cycle, relay contacts RBF17 open and thereafter the pick circuit for relay R1662 is through the R1689AU contacts.

It will be remembered that during the second card feed cycle of the tabulator relay R1634 (Fig. 3_a_) was energized and energized in parallel therewith is a relay RBFT. Energization of relay RBFT will open the RBFT—BL contacts in the pick circuit to relay RBF17. Relay RBF17 will pick only during the first cycle. Relay R1634 serves to complete a circuit at 322 degrees from line 920 (Fig. 3_b_), wire 924, cam contacts CR112, closed contacts R1634AL, the pick coil of a first card in relay R1688 and line 921. Relay R1688 is held by a circuit from the wire 924, closed contacts R1634AU, closed contacts R1688AU, the hold coil of relay R1688 and line 921. This hold circuit also serves to energize first card relays R1689 and RBFU. Following the pick of R1689 a circuit is completed from line 920, wire 924, cam contacts CRBF128, contacts R1689AU, now closed, closed contacts R1673BU, the pick coil of skip control relay R1662 and line 921.

The aforementioned run-in circuits are provided to set up an automatic feed of the first record sheet R from the bill feed hopper to the platen for the first line of print. With skip control relays R1661 and R1662 now energized, a circuit can now be completed to carry out the feeding of the first sheet from the aligner station to the platen. This circuit extends from line 920 (Fig. 3_c_), cam contacts CR53, closed contacts R1662B, closed contacts R1661BU, the pick coil of start relay R1676 and line 921. Start relay R1676 holds through a circuit from line 920, wire 929, transferred contacts R1676B, normally closed stop relay contacts R1684A, the hold coil of R1676 and line 921. Parallel circuits are also completed from contacts R1684A to the low speed magnet LS and through the closed contacts RBFY—AL to the high speed magnet HS.

Referring to Figs. 1 and 2, energization of the LS and HS magnets will operate the two speed clutch CL to drive the platen shaft and platen P at high speed. The lower third feed roll 21 will also operate at high speed through the gears 44 to 47. The transferred contacts R1676B in addition to picking the clutch magnets to get the platen turning also serves to drop out a control relay R1679 which is normally energized through the normally closed side of these contacts. When control relay R1679 drops out a circuit is completed from line 920, wire 929, normally closed contacts R1679B, closed contacts RBF1_g_, the third feed roll magnet coil FRM and line 921. With magnet FRM energized the upper third feed roll 20 is lowered and the aligner stop 19 also lowered in the manner previously described to feed the sheet out of the aligner station to the turning platen. The sheet will continue to feed until the stop relay R1684 is energized under control of either of the control tapes or the stop key is depressed.

To summarize very briefly what has taken place by the circuits described thus far, the tabulator and bill feed have both been started and have operated for two machine cycles. During the first tabulator cycle, the first card in the tabulator, which bears line selection data, has been fed from the magazine to the first read station and during the first bill feed cycle the first record sheet in the bill feed has been fed from the hopper to the aligner station. During this cycle the line selection data in the card is read to set up line selection relays to be described. Also, other data in the card may be read and put into storage for comparison with data on the record sheet which is also read during this cycle by the bill feed brushes 15. The comparing operation will not be discussed since it is well known in the art and fully disclosed in Patent 2,573,313. During the second cycle, feeding of the first sheet from the aligner station to the platen was initiated and a second sheet fed from the hopper to the aligner station. Also, the first card in the tabulator moved from the first read station to the second read station where it will be read to effect printing on the sheet at the platen and a second card fed out of the magazine and into the first read station.

The following portion of the disclosure will deal specifically with the novel controls for stopping the sheet at the platen. In accordance with the present invention, two control tapes are provided so that the successive record sheets feeding through the bill feed may be fed variable distances from the aligner station to the platen to effect variable first line printing. As shown in Fig. 1, each of the tape rolls A and B is clutched to the platen shaft through the respective clutches UCR, LCR and platen gears 67, 68. These clutches normally are continuously engaged by a circuit which extends from line 920 (Fig. 3*c*), wire 929, the closed contacts RLSA—A and the normally closed side of contacts RLS17C, the UCR clutch magnet coil UCM and line 921. The circuit also extends from the wire 929, through the closed contacts RLSB—A, the LCR clutch magnet coil LCM and line 921. As was previously mentioned, during each eject cycle when a record sheet is to be fed from the platen to the stacker and another sheet fed to the platen, relays LSA and LSB are energized under control of one of the control tapes selected by contacts of the eject relay RLS17. The contacts RLS17C provide a switch for alternating the function of the tape contact rolls. It will be remembered that during the run-in operation described above that eject relay RBF4 was energized at 120 degrees and holds until 348 degrees and that at 338 degrees the platen was clutched to initiate a sheet feed. As a result, at 300 degrees a circuit is completed from line 320 (Fig. 3*c*), wire 929, cam contacts CR69A, closed contacts RBF4*e*, the normally closed side of contacts RLS15*b*, the pick coils of relays RLS17 and RLS39 and line 921. The hold circuit for these relays extends from the line 920, wire 929, cam contacts CR29 and closed contacts RLS16*b*, in parallel, the closed contacts RLS17*a*, the hold coils of relays RLS17 and RLS39 and line 921.

Since both tape roll clutches are normally engaged it can be understood that when the platen was clutched and the first sheet began to move from the aligner station that both tape rolls A and B and their respective tapes also move in synchronism with the sheet. Consequently, relays RLS17 and RLS39 are picked to select one of the control tapes to be used to control the stopping of the sheet and to switch control of the line selection relays to the selected tape.

At 200 degrees a circuit is completed from line 920 (Fig. 3*c*), wire 929, cam contacts CR23, closed contacts RLS17*b*, the pick coil of relay RLS15 and line 921. Relay RLS15 will hold in parallel with relays RLS17 and RLS39 through the now closed contacts RLS15*a*. These relays will remain operated until a relay RLS16 is energized to open the RLS16*b* contacts in the hold circuit. As will be presently seen, as long as these relays remain operated the stop positions of the sheet moving to the platen is controlled by the lower tape and contact roll. Although the RLS15*b* contacts in the pick circuit of relay RLS16 are now transferred, the relay cannot be picked at this time because the eject relay RBF4 will have dropped out at 348 degrees of the previous cycle to open the RBF4*e* contacts. The relays RLS17 and RLS39 will remain operated, then, until eject relay RBF4 is energized on an eject cycle.

Figure 3C:
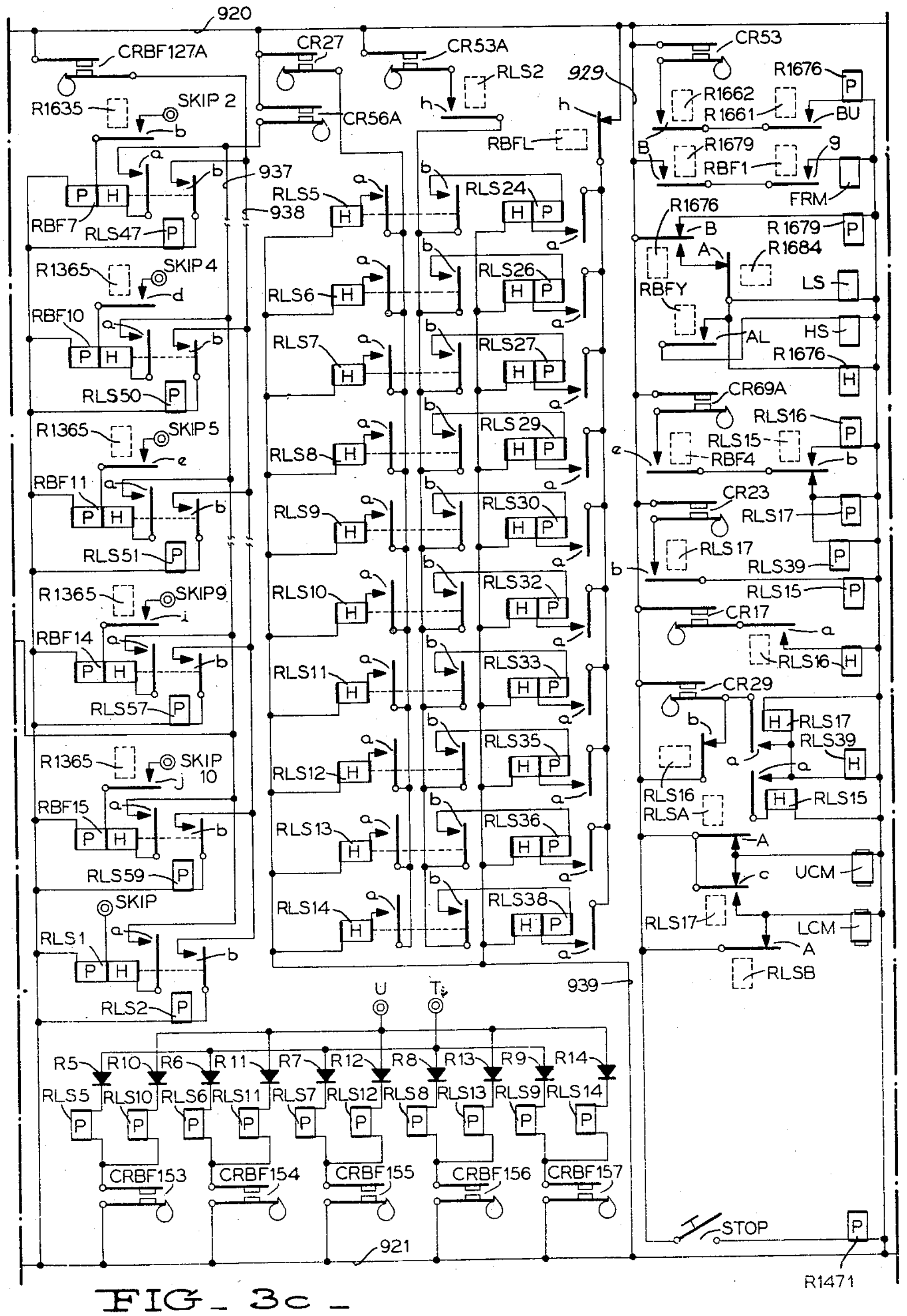
Figure 3D:
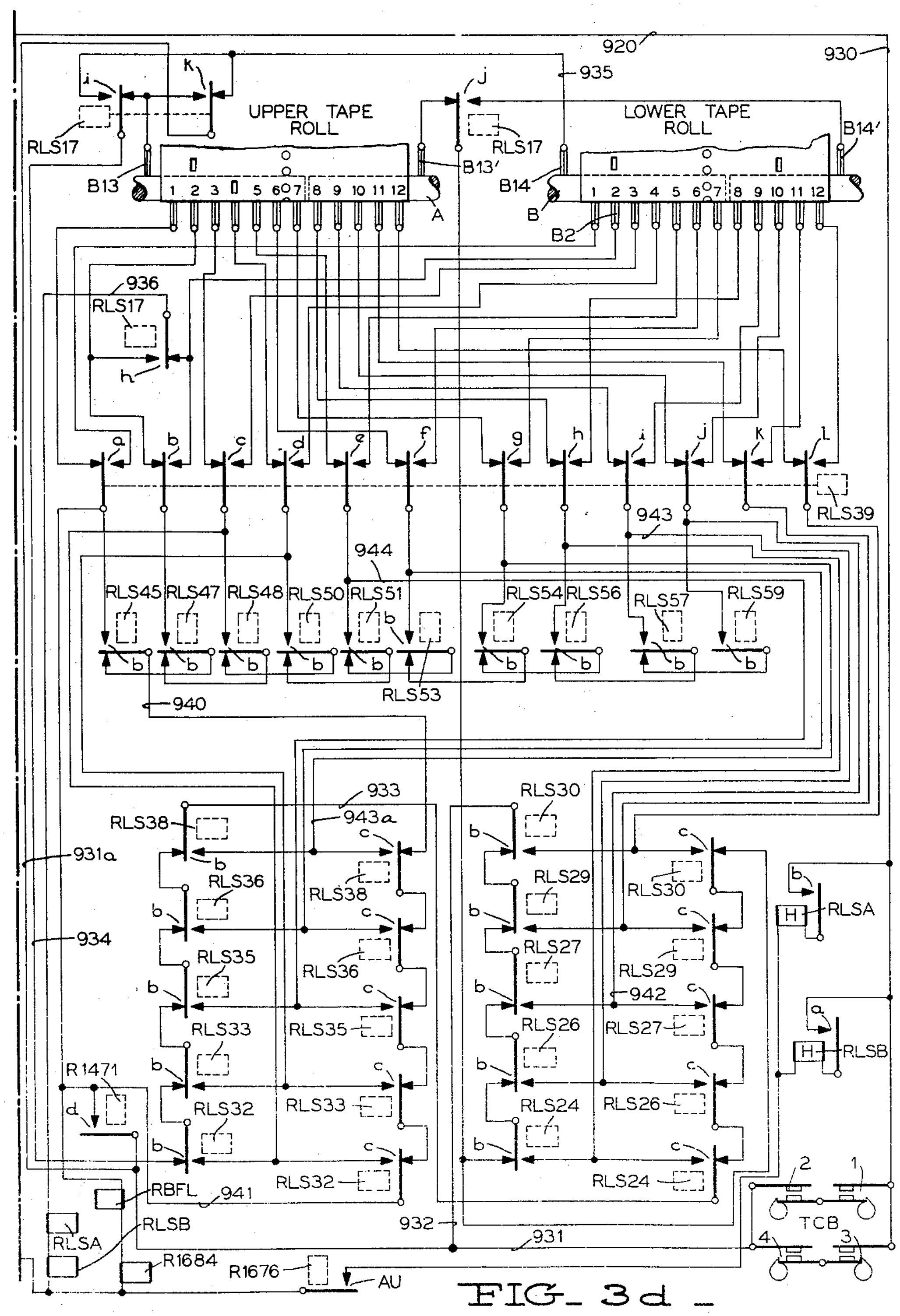

Shown on Fig. 3*d*, is a diagrammatic representation of the upper and lower split contact rolls A and B holding the upper and lower control tapes with the spacing and line selection controls exercised by control indicia in each tape in association with the twelve sensing brushes B1—B12 provided for each tape. Brushes B13, B13′ and B14, B14′ are used at all times as common contact members in association with conductive parts of the tape contact rolls. The timing of control impulses to the rolls is made accurate with respect to the tape feed because circuit breaker contacts TCB1–4 are operated from suitable cams (not shown) on the platen clutch shaft and are operated in synchronism with the tape contact rolls. The cam shaft 32 (Fig. 2) operates the various CBF cam contacts referred to in the electrical description.

It was mentioned that relays RLSA and RLSB are operated from a perforation in channel two of the control tape selected by contacts of the eject relay LS17. Since relay RLS17 was energized and the two control tapes put in motion in synchronism with the record sheet, when the perforation is sensed in channel two a circuit is completed from line 920 (Fig. 3*d*), wire 930, circuit breaker contacts TCB1–4, wire 931, wire 931*a*, transferred contacts RLS17*k*, common brush B13, upper contact roll A, perforation in channel two of the tape, brush B2, transferred contacts RLS17*h*, wire 936, the pick coils of relays RLSA and RLSB and line 921. Referring to the right-hand section on Fig. 3*c*, it may be seen that RLSA—A and RLSB—A contacts now open causing the upper contact roll magnet UCM to drop out but allowing the lower contact roll magnet LCM to remain energized through the transferred contacts RLS17*c*, wire 929 and line 920. Consequently, the upper contact roll clutch will disengage and the contact roll will latch in its home position in readiness to be moved in step with the sheet being held at the aligner station. Meanwhile, the lower contact roll will move in synchronism with the sheet moving toward the printing platen and the sheet will be positioned under control of perforations in the lower control tape. Relays RLSA and RLSB will be held until the sheet is stopped at the platen by a circuit which extends from line 920 (Fig. 3*d*), wire 930, closed contacts RLSA—B and RLSB—B in parallel, the hold coils of RLSA and RLSB, contacts R1676AU, now closed, and line 921.

Referring to Fig. 1, it is seen that the line selection perforations LS of the card are sensed at the first read station where the units order brush is plugged to U and the five code relays LS10—LS14, and the tens order brush is plugged to T and the five code relays LS5—LS9. The same connections are shown more fully in the wiring diagram, Fig. 3*c*, where it is seen that cam contacts CRBF153—157 are timed so that certain combinations of two out of five relays are picked up for each digit representing perforation. The chart, Fig. 5, shows the particular combination for each digit in both units and tens orders. For example, for the sensed digit perforations of line selection number 37, relays RLS6 and RLS7 are picked up in the tens order, and relays RLS12 and RLS14 are picked up in the units order.

The timing chart, Fig. 4, shows that the different CRBF cam contacts are closed at certain various index point positions as follows:

| Cam contacts: | Index points |
|---|---|
| CRBF 153 | 0, 2, 5 and 8. |
| CRBF 154 | 0, 3, 6 and 9. |
| CRBF 155 | 1, 3, 5 and 7. |
| CRBF 156 | 1, 4, 6 and 8. |
| CRBF 157 | 2, 4, 7 and 9. |

A sample tens order code relay circuit would be completed from the first reading station commutator (Fig. 3*b*) for the card column having the 3 perforation through a plug wire connection between the commutator socket and socket T (Fig. 3*c*), rectifier R6 which prevents back circuits, the pick coil of relay RLS6, cam contacts CRBF154 closed at "3" time and line 921. Relay RLS7 is also picked up in a similar fashion through cam contacts CRBF155 also closed at "3" time.

In the units order the circuit is completed from the first reading station commutator for the card column having the 7 perforation through a plug wire connection between the commutator socket and socket U (Fig. 3*c*), rectifier R12, the pick coil of relay RLS12, cam contacts CRBF155 closed at "7" time and line 921. Relay RLS14 is also picked up in a similar fashion through cam contacts CRBF157 also closed at "7" time.

As noted in the left center portion of Fig. 3*c*, holding circuits are provided for the relays RLS5—RLS14 through the cam contacts CR27 and the "*a*" contacts and hold coils of the respective relays. These relays will hold through cam contacts CR27 until 354 degrees of the cycle in which the card is read at the first read station.

As seen at the right center portion of Fig. 3*c*, the "*b*" contacts of relays RLS5—RLS14 are connected, respectively, to related pick coils of line selection transfer relays RLS24, 26, 27, 29, 30, 32, 33, 35, 36 and 38. These latter relays hold until contacts RBFL*h* open and serve to establish a stop path, as will be understood. However, before circuits to the latter relays can be completed a pair of line selection control relays RLS1 and RLS2, shown in the left-hand column of Fig. 3*c*, must be operated. These relays are called in whenever a skipping operation of the sheet is to be carried out under control of line selection and various types of control impulses could be used, such as, a machine or all cycles impulse which is available during each cycle of machine operation. A sample circuit includes line 920 (Fig. 3*a*), cam contacts CR65, all cycles socket, plug wire connection to the skip socket (Fig. 3*c*) the pick coil of relay RLS1 and line 921. Relay RLS1 will hold until 348 degrees by a circuit from line 920, cam contacts CR56A, wire 937, closed contacts RLS1*a*, the hold coil of RLS1 and line 921. At 317 degrees a circuit will extend from line 920, cam contacts CRBF127A, wire 938, closed contacts RLS1*b*, the pick coil of RLS2 and line 921. Referring to Fig. 3*b*, relay RLS2 will hold until the end of a skip by a circuit which extends from line 920, wire 924, normally closed contacts RBFL—AL, transferred contacts RLS2*a*, the hold coil of relay RLS2, wire 927 and line 921.

With relay RLS2 energized a circuit is completed at 338 degrees which extends from line 920 (Fig. 3*c*), cam contacts CR53A, closed contacts RLS2*h*, the "*b*" contacts of the code relays RLS5—RLS14 and the pick coils of the afore-mentioned line selection transfer relays, wire 939 and line 921. The hold coils of the transfer relays will be energized through the "*a*" contacts of the relays, normally closed contacts RBFL*h* and the line until the sheet is stopped.

The line selection transfer relays then serve to close contacts in labyrinth comparing circuits involving the tape sensing brushes B3–12 for each contact roll as shown in Fig. 3*d*. There it is noted that the units transfer relays RLS32, 33, 35, 36 and 38 have transfer contacts arranged to carry an impulse to or from the units tape code brushes B3–7 of either the lower or upper contact roll, and in similar fashion the tens transfer relays RLS24, 26, 27, 29 and 30 have transfer contacts arranged to carry an impulse to or from the tens tape code brushes B8–12 of either the lower or upper contact roll. Since the line selection code (Fig. 5) is a two out of five code, a stop circuit is available through the transfer relay contacts when both relays representing each digit are energized.

The comparing circuit for a two digit line selection number will pass through two tape brushes per order or back and forth through four tape sensing brushes of the selected contact roll and in this connection it will be noted that the twelve sensing brushes for each contact roll are each connected to a related transfer contact of the line selection relay RLS39. These latter contacts serve to switch controls between the upper and lower contact rolls in accordance with the roll which is selected for control of the sheet.

There will also be seen in the labyrinth circuits, contacts of skip relays RLS45, 47, 48, 50, 51, 53, 54, 56, 57 and 59 which are connected to the tape brushes in parallel with the contacts of the line selection relays. These skip contacts are used in a well-known manner to selectively control the end of a skip when line selection controls are not being used. The skip relays are used to control skipping of the sheet until a stop perforation in a selected channel of the tape is encountered and they are energized by plug wiring an impulse, such as an all cycles impulse, to the sockets skip 1—10 (Figs. 3*b* and 3*c*) depending on the tape channel that is desired to control skipping. The skip sockets are rendered receptive to impulses through the contacts of an interlock relay R1365 which is energized from 221 to 331 degrees of every cycle by a circuit extending from line 920 (Fig. 3*b*), wire 924, cam contacts CR54, coil of relay R1635 and line 921.

For example, if skipping of a sheet is to be stopped upon sensing a perforation in channel 1 of the tape, the skip 1 socket (Fig. 3*b*) would be plug wired to the all cycles socket (Fig. 3*a*) to direct the impulse therefrom through closed contacts R1635*a*, normally closed side of contacts RBF4*d*, pick coil of skip control relay RBF6 and line 921. The hold coil of relay RBF6 is energized through the RBF6*a* contacts and cam contacts CR56. Closure of contacts RBF6*b* will complete a circuit from the cam contacts CRBF127 to energize the skip relay RLS45 for channel 1 control. In similar fashion, the other skip relays for channels 2—10 shown in the left-hand side of Fig. 3*c*, may be selectively energized to control end of skipping. Transfer of the "*b*" contacts of skip relay RLS45, for example, in the labyrinth circuit (Fig. 3*d*) will provide a circuit which extends from line 920, wire 930, circuit breakers TCB1–4, wires 931 and 932, normally closed side of the line selection relays to wire 934, the normally closed side of contacts RLS17*i*, common brush B13, perforation in channel 1 of the tape, contact roll A, brush B1, normally closed side of contacts RLS39*a*, transferred contacts RLS45*b*, wire 940, the normally closed side of line selection relays to wire 941, pick coils of stop relays RBFL and R1684 and line 921. The stop relays interrupt circuits in a manner to be described to stop the platen and skipping of the sheet.

In order to stop the record sheet R, Fig. 1, at the line corresponding to the line selection perforations LS in the card, an equal condition must be detected between the code perforations of the tape and the card code relay contact settings of the circuits at the right in Fig. 1. Similarity of line and tape code number perforations is detected when a circuit is completed through the closed card relay contacts and the related tape brushes. When listing, each card is found to be perforated at LS digitally with the line number representative of where the data is to be printed, and, at a corresponding position on the tape, related code perforations are punched. Although the card line number perforations and the tape code number perforations must agree as to digital value, it does not follow that the sheet line selected must be of the same number. For example, in the case of a card punched with a line selection number of 05, it is not necessary that the data thereof must be placed on the fifth line of the record; instead, the sheet advance can be carried to any line which is preselected by the position at which the tape is punched with the code perforations 05, and there is where the tape and sheet are stopped to await recording.

To simplify matters it is assumed for example that the tape and card are perforated for line selection with the indicia 37 and that the thirty-seventh line of the record sheet is to be brought into printing position. It is noted hereinbefore, that when a card is sensed at the first read station with the line selection perforations LS having a value of 37, then relays RLS6, 7, 12 and 14 are picked up and in turn pick up transfer relays RLS26, 27, 35 and 38. It is about to be explained how the contacts of the latter enter into a completed comparing circuit for stopping the sheet at the thirty-seventh line.

As the record sheet R and the lower control tape LTP advance in synchronism and come into the position wherein the thirty-seventh line of the sheet is at the printing line; then, at the same instant, the tape portion under brushes B3–12 is sensed as punched in the 5, 7, 9 and 10 channels to represent 37, and a "Skip End" or stoppage circuit is completed as follows: line 920 (Fig. 3*d*), wire 930, circuit breakers TCB1–4, wires 931 and 932, through the normally closed side of contacts RLS30*b* and RLS29*b*, transferred contacts RLS27*b*, wire 942, through transferred contacts RLS39*j*, tape brush B10 and through a perforation to the lower contact roll B, and back through another tape perforation in the ninth channel to brush B9, through transferred contacts RLS39*i*, wire 943, through transferred contacts RLS26*c*, normally closed side of contacts RLS24*c*, wire 933, transferred contacts RLS38*b*, wire 943*a*, through transferred contacts RLS39*g*, brush B7 and through a perforation to the lower contact roll B, and back through another tape perforation in the fifth channel to brush B5, through transferred contacts RLS39*e*, wire 944, through transferred contacts RLS35*c*, the normally closed side of contacts RLS33*c* and RLS32*c*, wire 941, the pick coils of stop relays RBFL and R1684 to line 921.

Relay R1684 then operates to open contacts R1684A in series with the clutch magnets LS and HS (Fig. 3*c*) which opens the sheet feed clutch and brings the sheet space skipping motion to an end with the thirty-seventh line of the sheet at the print receiving position to record the data of the card as analyzed at the second read station governing the type wheels TW. It is to be noted that contacts R1684A also open the hold circuit to the start relay R1676 and consequently the R1676AU contacts (Fig. 3*d*) open to release the relays RLSA and RLSB so that when movement of the platen is again initiated, both contact rolls will operate.

Also, the RBFL—AL contacts (Fig. 3*b*) open to drop out line selection relay RLS2 and the RBFL*h* contacts (Fig. 3*c*) open to drop out the line selection transfer relays in preparation for the next line selection operation.

It is not believed necessary to discuss the manner in which the type wheels are controlled to record on the sheet positioned at the platen. A full disclosure of a print operation may be found in the afore-mentioned Patent 2,569,829.

After recording takes place it becomes necessary to call in an eject cycle to feed the sheet just recorded on from the platen to the stacker and the succeeding sheet from the aligner station to the platen where it will be positioned for recording. In accordance with the principles of the invention this is carried out with one of the control tapes always in step with the sheet moving from the aligner station to the platen enabling the individual sheets to be moved varying distances, if desired, to be stopped at the platen at varying first line print locations.

As is well known, an eject cycle may be called in in several ways such as, for example, the previously mentioned machine or all cycles impulse which is available after print time every cycle, or from an impulse set up as a result of an unequal comparison between control indicia on the cards being sensed at the first and second read stations in the tabulator. The control indicia compared may be the line selection perforations and in the present case where the sheet was recorded on under control of the card bearing the line selection perforations 37 as analyzed at the second read station and assuming that the following card at the first reading station bears the line selection perforations 38, then by well-known comparing circuitry, fully disclosed in Patent 2,569,829, a control break would be detected between the units digits 7 and 8 and an impulse set up as a result. The impulse is usually directed to a plug socket to be used for control purposes.

Referring to Fig. 3*b*, there is noted an eject socket which may be plug wired to receive a control break impulse described above or may be plug wired to the all cycles socket shown on Fig. 3*a*. This will result in a circuit being completed through the normally closed side of contacts RBF17*b*, contacts RBF1*c*, which are closed as long as the BF switch is on, the pick coil of eject relay RBF4 and line 921. It will be remembered that during the run-in cycle, RBF4 was automatically picked through CR52 and run-in relay RBF17 contacts.

With relay RBF4 energized, the same sequence of circuits as was previously described will be completed to energize the hopper clutch magnet HCM, the low speed magnet LS and the third feed roll magnet FRM. As a result the sheet at the platen will move to the stacker and the sheet at the aligner to the platen and since relays RLSA and RLSB have been released, both contact rolls will be engaged with the upper roll moving in step with the sheet moving from the platen and the lower roll moving in step with the sheet moving from the aligner station.

Referring to Fig. 3*c*, it will be remembered that relays RLS15, RLS17 and RLS39 were previously energized and that they are holding through the normally closed contacts RLS16*b*. With relay RBF4 energized, a circuit may now be completed at 300 degrees from line 920 (Fig. 3*c*), wire 929, closed cam contacts CR69A, closed contacts RBF4*e*, transferred contacts RLS15*b*, the pick coil of relay RLS16 and line 921. Relay RLS16 holds until 295 degrees of the next cycle through the closed contacts RLS16*a* and cam contacts CR17. Contacts RLS16*b* now open and at 315 degrees cam contacts CR29 open to release relays RLS15, RLS17 and RLS39.

The relays RLSA and RLSB will again be energized from a perforation in channel two of the tape; however, this time since relay RLS17 has been released the circuit will extend through the lower tape as follows: line 920 (Fig. 3*d*), wire 930, circuit breaker contacts TCB1–4, wire 931, wire 931*a*, normally closed side of contacts RLS17*k*, wire 935, common brush B14, lower contact roll B, perforation in channel two of the tape, brush B2, normally closed side of contacts RLS17*h*, wire 936, the pick coils of relays RLSA and RLSB and line 921.

Referring again to the right-hand section on Fig. 3*c*, it may be seen that RLSA—A and RLSB—A contacts now open causing the lower contact roll LCR to drop out but allowing the upper contact roll magnet UCM to remain energized through the normally closed side of contacts RLS17*c*, wire 929 and line 920. Consequently, the lower contact roll which is in step with the sheet moving toward the stacker will be declutched and indexed to its home position whereas, the upper contact roll will move in synchronism with the sheet moving toward the printing platen and the sheet will be positioned under control of perforations in the upper control tape through the normally closed side of the RLS39 contacts.

Thus, it can be seen how the control tapes alternate in function during each eject cycle to control the feeding of the individual record sheets and it can be understood that the successive record sheets may be stopped with different print receiving line locations presented to the platen without getting out of control. I should also be noted that between eject cycles, ordinary skipping operations of the sheet being recorded on may be carried out under control of the tape that is in step with this sheet and that during such skipping operations, the following sheet at the aligner station and its related control tape will be skipped in synchronism with each other.

Should it become necessary to manually stop the feeding of sheets a stop key may be depressed to complete a circuit from line 920 (Fig. 3*c*), wire 929, stop key closed, the pick coil of a stop relay R1471 and line 921. With stop relay R1471 energized, a circuit will be completed from the circuit breakers TCB1–4 (Fig. 3*d*), wire 931, closed contacts R1471*d*, coils of stop relays RBFL and R1684 and line 921 to stop the platen.

It is to be noted that the labyrinth circuit on Fig. 3*d* is arranged so that the sheet moving to the platen will always be stopped. Continued feeding of record sheets due to malfunctioning of the line selection circuitry would not be desired. For normal line selection operation it was seen that the stop circuit was effected by picking four line selection relays, two out of each group of five, and transferring their contacts in the labyrinth circuit to establish a closed path between the circuit breakers TCB1–4 and the brushes 3—12 of the contact rolls. If malfunctioning should occur the circuitry is arranged to always stop the sheet under control of a perforation in channel 1 of either control tape.

For example, should the four line selection relays representing the line selection number fail to pick and hold, the stop circuit would extend from the circuit breakers TCB1–4, wires 931 and 932, through the normally closed side of the contacts of the line selection relays, wire 934, contacts RLS17*i* and on through either the upper or lower tape and related contact roll and brush B1, depending on the status of relay RLS17, and on through contacts RLS39*a* and the stop relays RBFL and R1684 to stop the sheet under control of a perforation in tape channel 1. The perforation in channel 1 of both tapes would be positioned to stop the sheet at the first print line.

A stop circuit is also available in the event that only one line selection relay of each group of five be operated instead of the required two from each group of five. For example, taking the line selection number 37 previously described, assume that the line selection relays RLS27 and RLS35 operated and that relays RLS26 and RLS38 failed. Then a stop circuit would extend from the circuit breakers, wire 931, normally closed side of contacts RLS30*b*, RLS29*b* and RLS27*b*, transferred contacts RLS26*b* and RLS26*c*, normally closed side of contacts RLS24*c*, wire 933, normally closed side of contacts RLS38*b* and RLS36*b*, transferred contacts RLS35*b* and RLS35*c*, normally closed side of contacts RLS33*c* and RLS32*c*, wire 941 and the stop relays RBFL and R1684.

While there have been shown and described and pointed out the fundamental novel features of the invention as applied to preferred embodiments, it will be understood that various omissions and substitutions and changes in the form and details of the device illustrated and in the operation may be made by those skilled in the art, without departing from the spirit of the invention. It is the intention, therefore, to be limited only as indicated by the scope of the following claims.

What is claimed is:

1. In a machine for operating on a record sheet, a pair of feed control tapes with indicia for controlling the positioning of said sheet, means for advancing said sheet and both said tapes in synchronism, means for operating said advancing means, means for sensing said indicia, means operable under control of said sensing means for selecting one of said tapes to control advancement of said sheet, and means under control of said sensing means and indicia in said selected tape to disable said operating means to stop said sheet in a predetermined position.

2. A machine according to claim 1 including means controlled by said selecting means for causing the other tape to index to a home position.

3. In a machine for operating on a record sheet, a pair of feed control tapes with indicia for controlling the positioning of said sheet, means for advancing said sheet, a rotatable means for supporting each of said control tapes for independent advancement, a clutch for each of said rotatable means and in engagement with said advancing means to effect advancement of both of said tapes in synchronism with said sheet, means for operating said advancing means, means for sensing said indicia, means operable under control of said sensing means for declutching one of said rotatable support means and tapes from said advancing means, and means under control of said sensing means and the clutched rotatable means and tape to disable said operating means to stop said sheet in a predetermined position.

4. In a machine for operating on a record sheet, a pair of feed control tapes with indicia for controlling the positioning of said sheet, means for advancing said sheet, a rotatable means for supporting each of said control tapes for independent advancement, a clutch for each of said rotatable means, a pair of magnets for operating said clutches, a control relay for operating each magnet, circuit means for normally operating both said magnets to effect engagement of both said clutches with said advancing means to advance both of said tapes in synchronism with said sheet, means for operating said advancing means, means for sensing said indicia, means under control of said sensing means for releasing both said relays, an electrical switch in said circuit means for preventing one of said clutch magnets from releasing whereby one of said control tapes continues to advance in synchronism with said sheet, and means under control of said sensing means and the indicia in said last-named tape for disabling said operating means to stop said sheet in a predetermined position.

5. In a machine controlled by a succession of records each bearing data indicia and line number representing line selection indicia for selecting the line of a record sheet upon which the data is to be recorded, means under control of said data indicia for recording the data on the sheet, means for feeding sheets one at a time to said recording means, a pair of feed control tapes each bearing indicia corresponding to the line selection identification of each line, means for advancing said control tapes in synchronism with a sheet advancing to said recording means, switch means for selecting one of said tapes to control said advancing sheet, means for causing the other tape to index to a home position to control the next sheet to be fed, and electrical control means for said feeding means and operated under joint control of the record line selection indicia and indicia on said selected tape for stopping the sheet in the selected recording position.

6. A machine according to claim 5 including means for sensing said line selection indicia of a record, code relays set up under control of said sensing means to represent a line number, a sensing means for indicia on one of said tapes, a second sensing means for indicia on the other tape, contacts controlled by said code relays, and said electrical control means includes a comparing circuit through said first tape sensing means and said contacts of the code relays, a second comparing circuit through said second tape sensing means and said contacts of the code relays, and means under control of said switch means for rendering one of said comparing circuits inoperable.

7. A machine according to claim 5 including means for sensing said line selection indicia of a record, code relays set up under control of said sensing means to represent a line number, a sensing means for indicia on one of said tapes, a second sensing means for indicia on the other tape, contacts controlled by said code relays, and said electrical control means includes a comparing circuit through said first tape sensing means and said contacts of the code relays, a second comparing circuit through said second tape sensing means and said contacts of the code relays, means under control of said switch means for rendering one of said comparing circuits inoperable and the other comparing circuit operable for stopping the sheet in the selected recording position, and a circuit effective when both of said comparing circuits are rendered inoperable for stopping said sheet at a predetermined recording position.

8. A machine according to claim 5 including means for sensing said line selection indicia of a record, two groups of five code relays each, said sensing means setting up two code relays of each group to represent a line number, a sensing means for indicia on one of said tapes, a second sensing means for indicia on the other tape, contacts controlled by said code relays, and said electrical control means includes a comparing circuit through said first tape sensing means and said contacts of the code relays, a second comparing circuit through said second tape sensing means and said contacts of the code relays, and means under control of said switch means for rendering one of said comparing circuits inoperable.

9. In a cyclically operable machine controlled by a succession of records each bearing data indicia and line number representing line selection indicia for selecting the line of a record sheet upon which the data is to be recorded, means under control of said data indicia for recording the data on the sheet, feeding means for advancing sheets one at a time to said recording means, a pair of feed control tapes each bearing indicia corresponding to the line selection identification of each line, driving connections between each control tape and said advancing means for advancing said tapes in synchronism with a sheet advancing to said recording means, means for initiating a cycle of operation of said feeding means, to advance a sheet to said recording means, switch means for selecting one of said tapes to control said advancing sheet, means conditioned by said switch means for causing the other tape to be disconnected from said feeding means and to index to a home position to control the next sheet to be fed, and electrical control means for said feeding means and operated under joint control of the record line selection indicia and indicia on said selected tape for stopping the sheet in the selected position for a recording operation.

10. A machine according to claim 9 including control means for initiating a second cycle of operation of said feeding means to advance said first sheet from said recording means and a second sheet to said recording means, means conditioned by said switch means for reconnecting the indexed tape to said feeding means, said control means operating said switching means whereby said first selected tape will be indexed to a home position and said first indexed tape will move with said second sheet to control the positioning of same at the recording means.

11. A machine according to claim 9 including control means for cyclically operating said feeding means to advance sheets to and from said recording means, said control means operating said switching means each cycle, and means under joint control of said control means and switch means for alternating the function of said control tapes each cycle.

12. A machine according to claim 9 including skip control means for calling in a skipping operation of said sheet after a recording operation, means controlled by said skip control means for operating said feeding means to skip said sheet and selected tape past the recording means and to concurrently feed another sheet toward said recording means, and means for connecting the indexed tape with said feeding means for movement in synchronism with said other sheet.

13. In a machine controlled by a succession of records each bearing data indicia and line number representing line selection indicia for selecting the line of a record sheet upon which the data is to be recorded, means under control of said data indicia for recording the data on the sheet, an aligner station, first feeding means for feeding a sheet to said aligner station, second feeding means for feeding a sheet from said aligner station to the recording means, a pair of feed control tapes each bearing indicia corresponding to the line selection identification of each line, means controlled by said second feeding means for advancing said control tapes in synchronism with a sheet feeding from said aligner station to the recording means, switch means for selecting one of said tapes to control the sheet advancing to the recording means, means for causing the other tape to index to a home position to control the sheet at the aligner station when it advances to said recording means, and electrical control means for said second feeding means and operated under joint control of the record line selection indicia and indicia on said selected tape for stopping the sheet in the selected recording positions.

14. A machine according to claim 13 including control means for calling in an eject cycle, means under control of said eject control means for operating said first and second feeding means to feed out the sheet at the recording means, to feed the sheet at the aligner station to said recording means, and to feed another sheet to the aligner station, said eject control means operating said switch means to effect movement of said indexed tape in synchronism with said other sheet to control the positioning thereof and to index said first selected tape to a home position to control the sheet at the aligner station.

15. A machine according to claim 13 wherein said aligner station includes a stop movable into and out of the sheet path and said second feeding means includes a pair of separable feed rolls for feeding a sheet away from said stop, and means for concurrently moving said stop out of the sheet path and closing said feed rolls to feed a sheet, said last means also operating to concurrently separate said feed rolls and move the stop into the sheet path.

References Cited in the file of this patent

UNITED STATES PATENTS 1,606,126 Houston ............... Nov. 9, 1926